US007448333B2

(12) United States Patent
Kinkead et al.

(10) Patent No.: US 7,448,333 B2
(45) Date of Patent: Nov. 11, 2008

(54) TURF OVERSEEDING APPARATUS AND METHODS

(75) Inventors: Scott Kinkead, Minneapolis, MN (US); Terrence R. Bondeson, Woodbury, MN (US); Tom Fiske, Brooklyn Park, MN (US); Thomas E. Isaman, Ham Lake, MN (US); Kenneth Sylvester, East Bethel, MN (US); Steven Ferguson, Scandia, MN (US); John Blackburn Kinkead, St. Paul, MN (US)

(73) Assignee: Turfco Manufacturing, Inc., Minneapolis, MN (US)

( * ) Notice: Subject to any disclaimer, the term of this patent is extended or adjusted under 35 U.S.C. 154(b) by 240 days.

(21) Appl. No.: 11/164,525

(22) Filed: Nov. 28, 2005

(65) Prior Publication Data

US 2007/0074645 A1   Apr. 5, 2007

Related U.S. Application Data

(60) Provisional application No. 60/723,281, filed on Sep. 30, 2005.

(51) Int. Cl.
*A01C 5/00* (2006.01)
*A01C 7/00* (2006.01)
*A01C 9/00* (2006.01)
*A01C 13/00* (2006.01)

(52) U.S. Cl. .................. 111/164; 111/167; 111/169; 111/170; 111/189; 111/195; 111/900

(58) Field of Classification Search .................. 111/130, 111/164, 167–170, 149, 157, 189–196
See application file for complete search history.

(56) References Cited

U.S. PATENT DOCUMENTS 2,748,986 A      6/1956    Steel ........................... 222/177

(Continued)

FOREIGN PATENT DOCUMENTS

WO      WO 2006/076768 A1      7/2006

OTHER PUBLICATIONS

Overseeder from Kestrel Golf and Sport, http://www.kestrelgolf-sports.co.uk/overseeder/overseeder.htm, May 2, 2003.

(Continued)

*Primary Examiner*—Christopher J. Novosad
(74) *Attorney, Agent, or Firm*—Alan Kamrath; Kamrath & Associates PA (57) ABSTRACT

A seeder (10) includes multiple cutting head units (30) pivotally mounted to a jack shaft (24) of a frame (12) and spring biased downwardly by hold downs (80). Each multiple cutting head unit (30) includes multiple roller blades (36) received on an axle (34) rotatably mounted in a carrier (32) and in gearing relation to the jack shaft (24). The roller blades (36) include a series of oppositely formed, circumferentially spaced radially extending indentations (36*a*) extending from a continuous, smooth periphery at a constant extent from the axle (34). Fingers (46) extending between the roller blades (36) are pivotally mounted to the carrier (32) to adjust the depth of the slits formed by the roller blades (36). Each hose (98) extending from a seed box (96) diverts seed into adjacent slits immediately after the roller blades (36).

20 Claims, 4 Drawing Sheets

U.S. PATENT DOCUMENTS

| | | | |
|---|---|---|---|
| 2,752,835 A | 7/1956 | Wright | 97/46.03 |
| 3,247,812 A | 4/1966 | Luciano et al. | 111/1 |
| 3,559,748 A | 2/1971 | Shelton | 172/604 |
| 3,752,238 A | 8/1973 | Chilton | 172/180 |
| 3,866,552 A | 2/1975 | Leidig | 111/85 |
| 4,043,404 A | 8/1977 | Sorlie et al. | 172/555 |
| 4,044,839 A | 8/1977 | van der Lely | 172/49 |
| 4,084,522 A | 4/1978 | Younger | 111/14 |
| 4,098,349 A | 7/1978 | Jilani | 172/555 |
| 4,099,576 A | 7/1978 | Jilani | 172/555 |
| 4,136,744 A | 1/1979 | Hammett et al. | 172/60 |
| 4,155,315 A | 5/1979 | Dobbins | 111/8 |
| 4,353,423 A | 10/1982 | Poggemiller et al. | 172/260.5 |
| 4,398,578 A | 8/1983 | Walters et al. | 141/238 |
| 4,407,371 A | 10/1983 | Hohl | 172/253 |
| 4,461,355 A | 7/1984 | Peterson et al. | 172/156 |
| 4,538,688 A | 9/1985 | Szucs et al. | 172/555 |
| 4,821,655 A | 4/1989 | Rizzo | 111/8 |
| 5,035,190 A | 7/1991 | Grimes | 111/195 |
| 5,038,868 A | 8/1991 | Rinelli | 172/48 |
| 5,265,547 A | 11/1993 | Daws | 111/175 |
| 5,425,318 A | 6/1995 | Keeton | 111/197 |
| 5,479,992 A | 1/1996 | Bassett | 172/4 |
| 5,517,932 A | 5/1996 | Ott et al. | 111/193 |
| 5,562,165 A | 10/1996 | Janelle et al. | 172/4 |
| 5,640,915 A | 6/1997 | Schaffert | 111/150 |
| 5,649,602 A | 7/1997 | Bruce | 172/604 |
| 5,709,271 A | 1/1998 | Bassett | 172/4 |
| 6,283,050 B1 | 9/2001 | Schaffert | 111/150 |
| 6,308,645 B1 | 10/2001 | Newkirk et al. | 111/63 |
| 6,347,593 B1 | 2/2002 | Moran et al. | 111/133 |
| 6,460,623 B1 | 10/2002 | Knussman et al. | 172/4 |
| 6,554,079 B2 | 4/2003 | Bruce | 172/604 |
| 6,644,224 B1 | 11/2003 | Bassett | 111/157 |
| 6,701,857 B1 | 3/2004 | Jensen et al. | 111/200 |
| 6,912,963 B2 | 7/2005 | Bassett | 111/163 |
| 2004/0216655 A1 | 11/2004 | Soun | 111/170 |
| 2004/0255834 A1 | 12/2004 | Schaffert | 111/200 |
| 2005/0022707 A1 | 2/2005 | Cresswell | 111/200 |
| 2005/0155536 A1 | 7/2005 | Wendte et al. | 111/200 |

OTHER PUBLICATIONS

"Mastering All Turf", http://www.locketurf.com/Products/flexseeder.htm, Oct. 5, 2005.

Redexim Charterhouse Overseeder 1575/2075 brochure, 2 pages.

Redexim Charterhouse User manual and parts handbook Overseeder Model 1575/2075, Apr. 2005, 13 pages.

TURF OVERSEEDING APPARATUS AND METHODS

BACKGROUND

The present invention generally relates to apparatus and methods of seeding and, in the preferred form, of seeding grass and, in the most preferred form, to apparatus and methods of seeding existing turf.

It is often desired that turf be overseeded. Specifically, due to winter kill and other environmental conditions, turf will include patches which are devoid of grass, will have insufficient plant populations per area, or is otherwise insufficient. Likewise, it may be desired to introduce grasses of different varieties into existing turfs by interseeding existing turfs, with such different varieties having desired characteristics such as disease or other environmental condition resistance different than the existing turf and often becoming available after the existing turf was initially established. However, it is desired to maintain the existing turf rather than start new, if possible. If the grass seed were simply spread unto undisturbed turf, the grass seed would often be suspended in the existing turf and, thus, will not germinate or will not grow if germinated. Likewise, if the grass seed does reach the actual soil, the percentage of seed that germinates and grows into the soil is not of a desirable level. Conventional seeders often increased the amount of seed to compensate for these and similar factors, but increasing the amount of seed increases the costs of seeding. On the other hand, disturbing the turf increases the chance of successful germination and growth, but often resulted in killing or otherwise damaging the existing turf. Such damage is, of course, not desired for appearance reasons such as in existing lawns adjacent residences, for functional reasons such as at golf courses where the reseeded areas may still be utilized at least for limited applications, or the like.

Thus, a need exists for apparatus and methods for seeding turf and having particular applicability for overseeding areas of existing turf while overcoming the deficiencies encountered by conventional attempts to overseed existing turf. Furthermore, in most preferred aspects, such apparatus should be designed with serviceability in mind for ease of operation, maintenance, and repair by the operator.

SUMMARY

The above needs and other problems in the field of seeding turf have been solved by providing, in the preferred form, apparatus and methods for seeding where a controlled flow of seed is carefully placed in an environment which enhances germination and growth. Such apparatus and methods include several inventive features which are believed to cooperate together to provide synergistic results but which could be utilized singly or in other combinations to overcome deficiencies and shortcomings in previously existing seeding attempts.

Specifically, in one aspect of the present invention, seeds are inserted into slits formed exclusively by roller blades having a series of oppositely formed, circumferentially spaced, and radially extending indentations extending from a continuous, smooth periphery at a constant extent from the rotation axis of the roller blades. In the most preferred form, the roller blades are driven to rotate in a direction opposite than if free rotating when engaging the seeding surface while moving in the seeding direction.

In a further aspect of the present invention, seed is directed from a single outlet of a seed box to two adjacent slits formed in the seeding surface. Thus, the number of outlets and feed tubes from the seed box to the seed distributor is substantially reduced, allowing the instrumentalities that create the slits to be placed closer together.

In another aspect of the present invention, fingers are adjustably mounted to a carrier rotatably mounting a plurality of roller blades arranged in a spaced parallel relation and rotatable about a rotation axis. Thus, the spacing from the rotation axis of the fingers located intermediate adjacent roller blades can be adjusted to provide depth adjustment of the slits formed by the roller blades.

In still another aspect of the present invention, spring biased down pressure is exerted on each of multiple cutting head units independently pivotally mounted to a frame moving along a seeding surface in a seeding direction. Each of the cutting head units includes a blade assembly including a plurality of roller blades arranged in a spaced parallel relation. In preferred aspects, the roller blades are powered to rotate at a different speed than free rotating due to the engagement with the seeding surface and/or have a seed distributor movable relative to a seed box mounted to the frame.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "width", "length", "end", "side", "trailing", "horizontal", "vertical", "axial", and similar terms are used herein, it should be understood that these terms have reference only to the structure shown in the drawings as it would appear to a person viewing the drawings and are utilized only to facilitate describing the illustrative embodiment.

DESCRIPTION

A seeder according to the preferred teachings of the present invention is shown in the drawings and generally designated 10. Seeder 10 generally includes a frame 12 for movement along a seeding surface desired to be seeded. In the preferred form, seeder 10 and frame 12 are intended to be towed by a towing vehicle, not shown, such as a tractor, in a seeding direction, with the towing vehicle also providing operative power to seeder 10 in addition to motive power. However, it should be appreciated that seeder 10 according to the teachings of the present invention could take other forms than shown, with seeder 10 providing some or all of its own power requirements.

Figure 1:
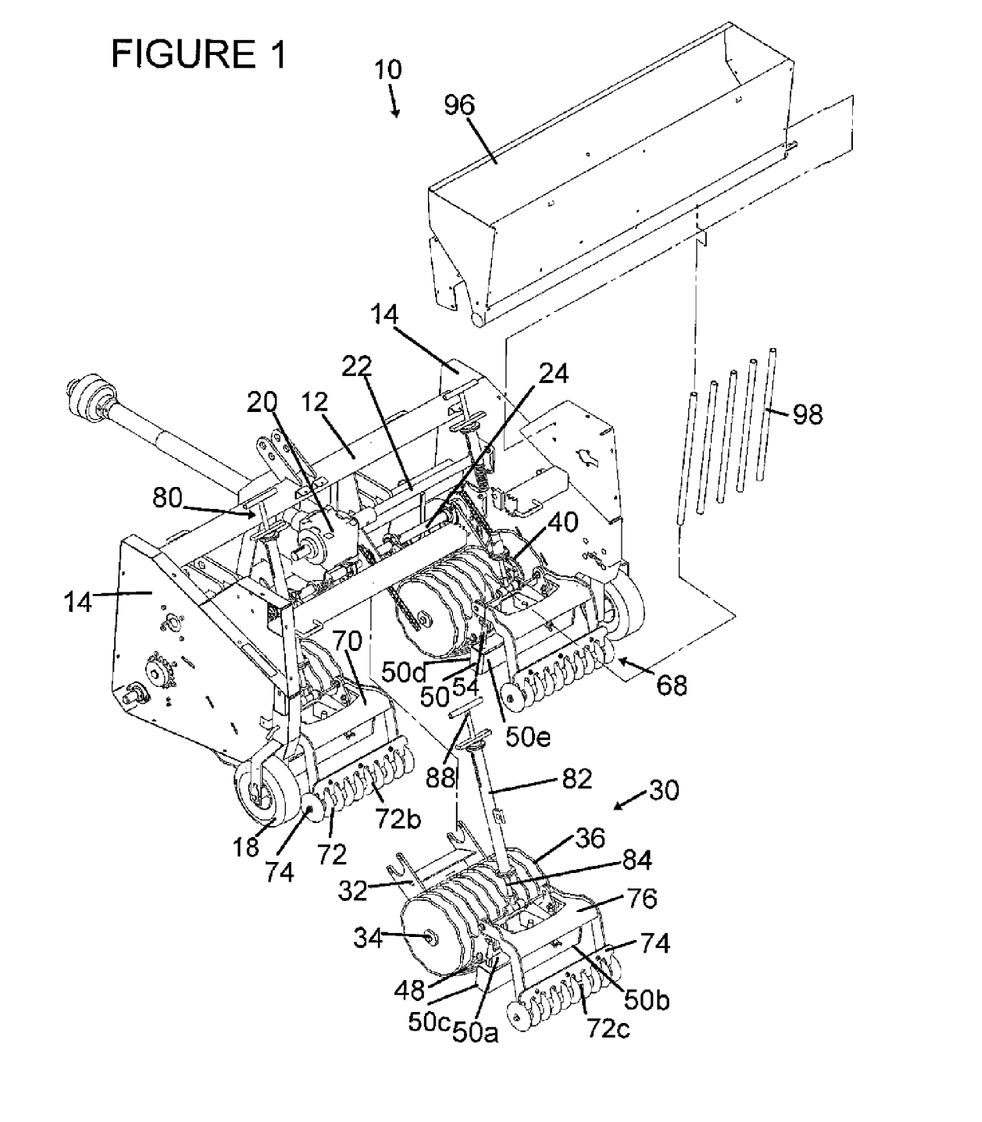
FIG. 1 shows an exploded perspective view of a turf overseeding apparatus according to the preferred teachings of the present invention.

Frame 12 in the form shown includes first and second side panels 14 extending perpendicular to the seeding surface and parallel to the operation movement direction. In the most preferred form, frame 12 is attached to the towing vehicle utilizing a conventional three point hitch system, which system is well known in the field of towing vehicles. Side panels 14 can be suitably movably supported on the seeding surface as desired such as by rollers, not shown, at the leading corners thereof and by caster wheel assemblies 18 at the trailing corners thereof. Operative power in the most preferred form is provided to frame 12 by a conventional power take off system attached to a gear box 20 at the center of frame 14 and rotating drive shafts 22 extending therefrom and into side panels 14. A jack shaft 24 is suitably rotatably mounted between side panels 14 of frame 12 parallel to the seeding surface and perpendicular to the operation movement direction, with jack shaft 24 being formed as a unitary component including one or more parts. Jack shaft 24 is suitably driven for rotation such as being in driving relation such as by being in gearing relation to the ends of draft shafts 22 such as by a roller chain and sprocket assembly in the preferred form.

Seeder 10 includes a cutting head assembly which in the preferred form is formed by multiple cutting head units 30, with three cutting head units 30 being provided in the most preferred form. In the most preferred form, cutting head units 30 are of the same construction and are independently pivotally mounted to frame 12 and are independently operated from each other.

Figure 2:
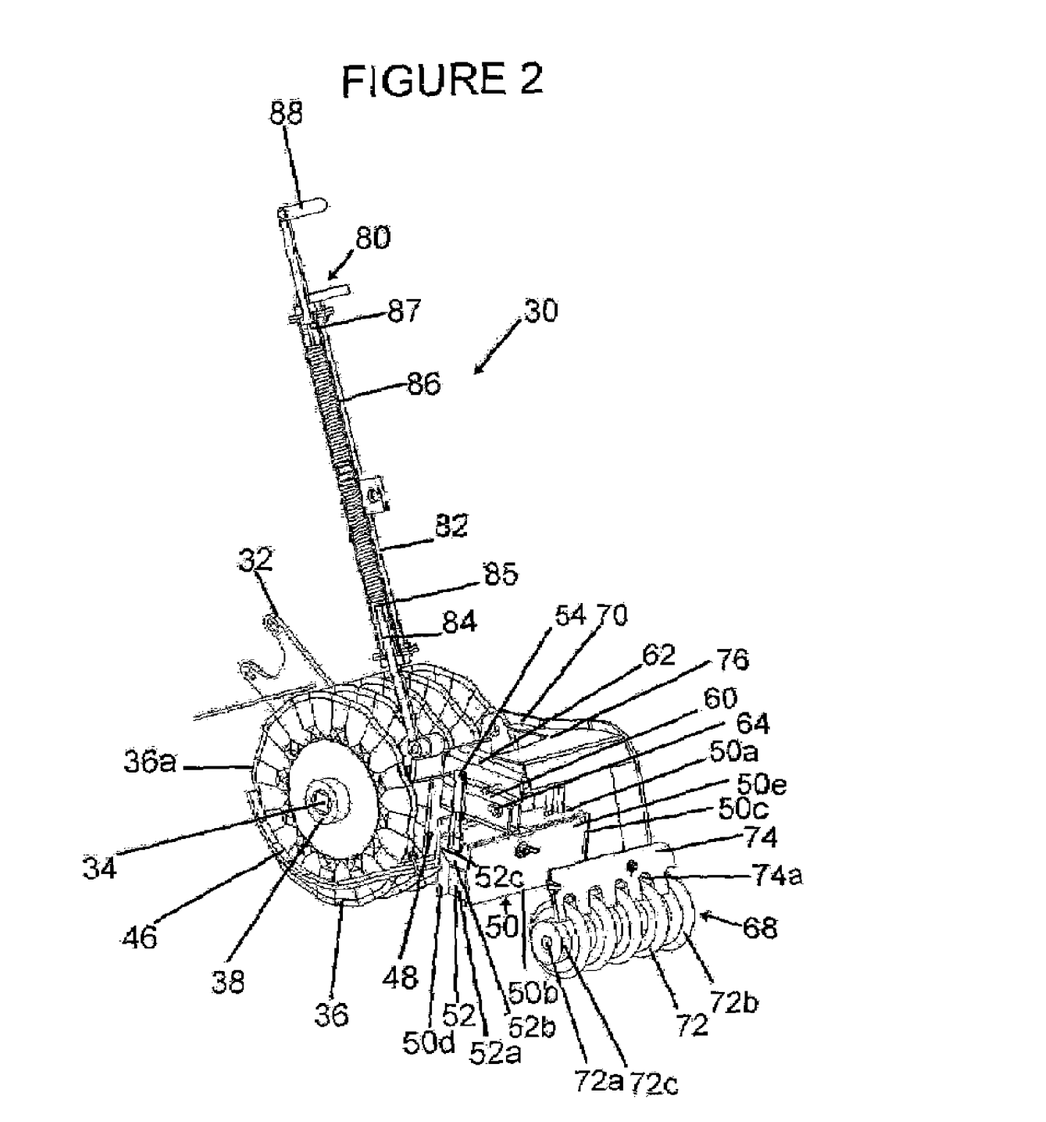
FIG. 2 shows a perspective view of a cutting head unit of the turf overseeding apparatus of FIG. 1.
Figure 3:
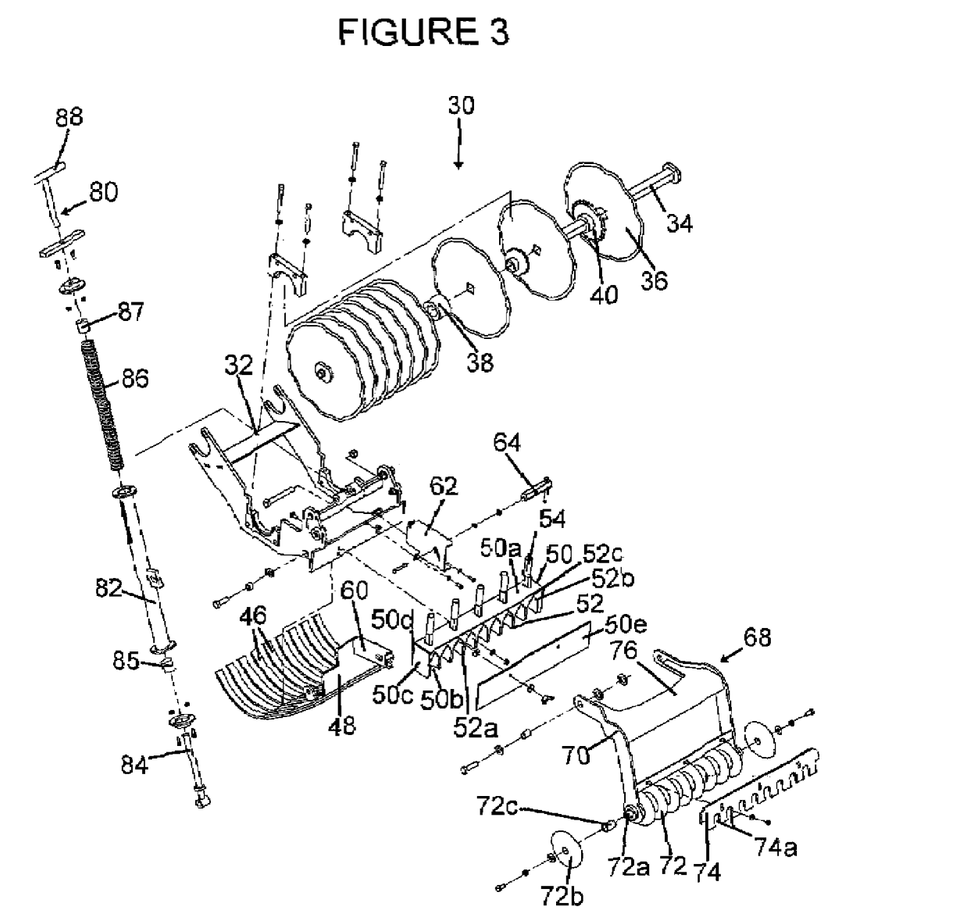
FIG. 3 shows an exploded perspective view of the cutting head unit of FIG. 2.

In the form shown, each cutting head unit 30 generally includes a concave carrier 32 having a leading end suitably pivotally mounted to jack shaft 24 and, in particular, which allows jack shaft 24 to rotate relative to carrier 32 and allowing carrier 32 to pivotally move relative to frame 12 and to the seeding surface about a drive pivot axis defined by jack shaft 24 in the most preferred form. Thus, due to mounting of carrier 32 to jack shaft 24, carrier 32 moves with frame 12 relative to the seeding surface in the seeding direction.

Figure 4:
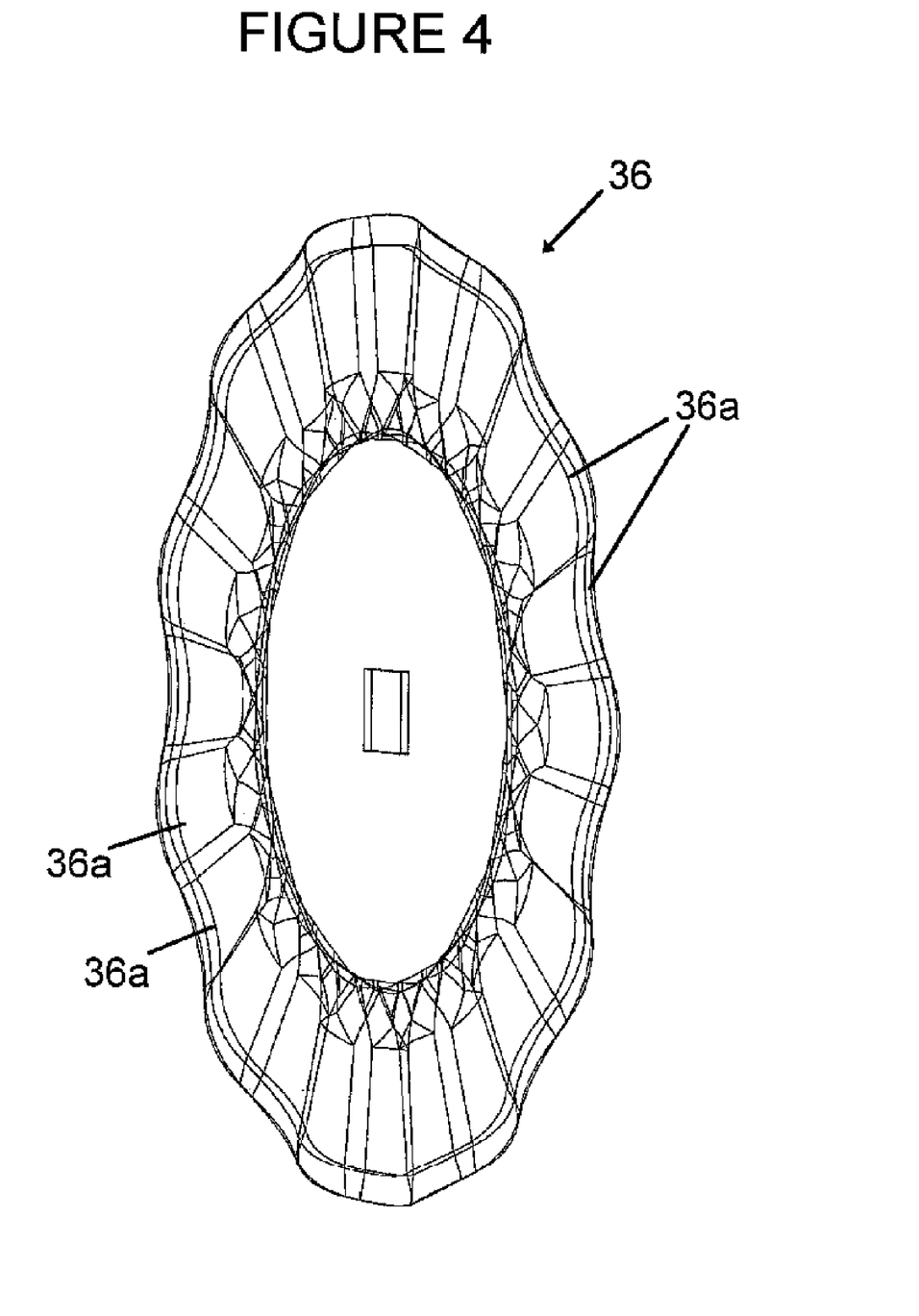
FIG. 4 shows a perspective view of a roller blade of the cutting head unit of FIG. 2.

A blade assembly is rotatably mounted to the carrier 32 about a rotation axis parallel to the drive pivot axis and jack shaft 24. In the most preferred form, the blade assembly includes an axle 34 rotatably mounted to carrier 32 which in the preferred form has non-circular cross sections. A plurality of unitary, roller blades 36 are non-rotatably received on axle 34 in a parallel relation at equal axial spacings to thereby be rotatably mounted to carrier 32 about the rotation axis. In the preferred form, roller blades 36 are generally planar, but in the most preferred form, includes a peripheral edge including offsets, with twelve offsets being provided in the most preferred form. In the most preferred form, the peripheral edge follows a sinusoidal curve on opposite sides of a center plane extending through the axial center of blade 36. Suitable spacers 38 are provided on axle 34 between adjacent blades 36. Each of at least an axially spaced pair of spacers 38 includes a bearing for mounting to carrier 32. Further, at least one spacer 38 includes a sprocket 40.

In the preferred form, the blade assembly is driven such as by being in rotational and preferably gearing relation to jack shaft 24 through sprocket 40 and a roller chain and sprocket assembly in the most preferred form. In the preferred form, the blade assembly is driven to rotate opposite to the operation movement direction. Specifically, the blade assembly is rotated in a direction opposite that the blade assembly would rotate if free rotating and as a result of movement in the operative movement direction. Further, in the preferred form, the blade assembly is driven at a rotational speed of a numerical speed different than that of the rotational speed would rotate if free rotating, and in the most preferred form would rotate at a rotational speed in the order of 450-525% of the rotational speed of free rotation resulting from operational movement.

Suitable provisions are provided to prevent roller blades 36 of the blade assembly from exceeding a desired depth into the seeding surface, and in the preferred form with the depth desired being adjustable according to actual seeding conditions. In the preferred form, a plurality of fingers 42 is provided in a spaced, parallel relation. A finger 46 is provided between adjacent roller blades 36, with all of the fingers 46 in each separate blade assembly being mounted together on a single support 48 in the form shown. Each finger 46 in the preferred form has a continuous curvature over its operative length and in the preferred form shown from support 48 to their free ends. In the most preferred form, support 48 is pivotally mounted to the trailing end of concave carrier 32 and, in the form shown, by bolts extending through flanges at the outer edge of concave carrier 32 and defining a support axis spaced from and parallel to the rotation axis of roller blades 36.

Each blade assembly includes a seed distributor for distributing seeds onto the seeding surface and, in the preferred form, into slits cut by each roller blade 36. In particular, the seed distributor is generally a right parallelepiped box 50 and includes a closed top 50a, an open bottom 50b, closed ends 50c, a closed leading side 50d, and a closed trailing side 50e, with sides 50d and 50e being parallel to axle 34. In the preferred form, side 50e is removably attached to top 50a and ends 50c for servicing and/or inspection. Multiple diverters 52 carried as a single unit are provided inside of box 50 and of wedged-shaped, cross-sections perpendicular to the seeding direction. Specifically, each diverter 52 includes first and second planar legs 52a parallel to and spaced from ends 50c and extending perpendicular from leading side 50d from bottom 50b towards but spaced from top 50a. Diverters 52 include angled planar heads 52b extending from the upper edges of legs 52a and at a nonparallel angle to legs 52a and ends 50c and extending from leading side 50d towards top 50a and interconnected at an upper edge 52c. Upper edges 52c of alternate diverters 52 are spaced from top 50a, with upper edges 52c of diverters 52 intermediate the alternate diverters 52 abutting or being closely adjacent top 50a. Seed slots aligned with each roller blade 36 are defined between planar legs 52a of adjacent diverters 52 (or between ends 50c and planar legs 52a of the outer diverters 52). Seed tubes 54 extend through top 50a and are aligned with edge 52c of alternate diverters 52 spaced from top 50a. In the most preferred form, tubes 54 have circular cross sections above box 50 and have right parallelepiped cross sections inside of box 50, with the right parallelepiped cross sections of tubes 54 having a length generally equal to ends 50c and extending equidistant on opposite sides of edge 52c. The seed distributor is mounted to the trailing end of concave carrier 32.

As previously indicated depth adjustment of the blade assembly is provided in the preferred form. In the form shown, a mast 60 extends from support 48 beyond box 50. A mast 62 extends from concave carrier 32 equidistant to mast 60. A bolt 64 extends from one of masts 60 or 62 and through a lost motion slot formed in the other mast 60 or 62 to removably secure masts 60 and 62 to each other spaced from the support axis. By tightening or loosening the head of bolt 64, relative movement between masts 60 and 62 and between support 48 and concave carrier 32 is prevented or allowed.

Each cutting head unit 30 in the preferred form includes a packer 68. In the form shown, the packer 68 includes a concave carriage 70 having a leading edge pivotally connected to the trailing edge of carrier 32. A roller 72 is rotatably mounted to the trailing edge of carriage 70, with roller 72 having an axial length generally equal to, parallel to and spaced from the blade assembly. A scraper 74 is adjustably mounted to carriage 70 and includes a scraping edge in sliding engagement with roller 72. In the most preferred form, carriage 70 includes a cross bar 76 abutable with mast 60 which limits the downward pivotal movement of packer 68 relative to carrier 32.

In the most preferred form, roller 72 includes an axle 72a extending between and rotatably mounted in carriage 70. A plurality of packer blades 72b are non-rotatably received on axle 72a at equal axial spacings corresponding to the axial spacings of roller blades 36. In the preferred form, packer blades 72b are generally planar, but in the most preferred form, are machined to displace the outer edges of the slits in the seeding surfaces created by roller blades 36 toward their centers to provide additional soil on the seeds. Packer blades 72b also press down on the additional soil and seeds to ensure firm contact between them and thereby enhancing the possibility of germination. Suitable spacers 72c are provided on axle 72a between adjacent packer blades 72b. Each of at least an axially spaced pair of spacers 72c include a bearing for mounting to carriage 70. The scraping edge of scraper 74 includes a plurality of cutouts 74a corresponding to and for receiving the packer blades 72b.

Each cutting head unit 30 is spring biased towards the seeding surface. In the preferred form, hold downs 80 are provided extending between frame 12 and carrier 32 of cutting head unit 30. Specifically, in the preferred form, the hold down 80 includes a cylinder 82 pivotally mounted to frame 12. A rod 84 is pivotally mounted to ears provided on the trailing end of carrier 32 and includes a piston 85 slidably received in cylinder 82. Thus, piston 85 is carried by carrier 32. A spring 86 is sandwiched and biased between piston 85 of rod 84 and a piston 87 of T-shaped handle 88 slideably received in cylinder 82. Thus, piston 87 is carried by frame 12. By threading T-shaped handle 88 into or out of cylinder 82, the compression of spring 86 between rod 84 and handle 88 can be threadably adjusted. Thus, hold downs 80 exert down pressure on cutting head unit 30.

Seeder 10 of the preferred form further includes a seed box 96 mounted to frame 12 and which can be of a conventional form for holding a supply of seeds and supplying a metered amount of such seeds through multiple outlets in communication with tubes such as hoses 98 shown in the preferred form and connected to each seed tube 54 extending between seed box 96 and the seed distributor allowing relative movement of seed box 96 and the seed distributor. Seed box 96 can be suitably powered such as being ground driven, powered directly or indirectly by the power take off of the towing vehicle, or powered in other manners. In the preferred form, the number of outlets and hoses 98 of seed boxes 96 is substantially less and in the preferred form is half the number of roller blades 36 and slits formed thereby.

Now that the construction of seeder 10 of the preferred form according to the preferred teachings of the present invention has been explained, the operation of such seeder 10, novel features, and advantages of seeder 10 can be set forth and appreciated. In particular, the towing vehicle with seeder 10 mounted to the three point hitch thereof can be moved to the seeding surface desired to be seeded. It should be appreciated that frame 12 can be at least partially elevated during transport. In this regard, piston 87 of T-shaped handle 88 abuts with the top of cylinder 82 and piston 85 of rod 84 abuts with the bottom of cylinder 82 to limit the relative movement of each cutting head unit 30 relative to frame 12 such that each cutting head unit 30 can be raised above the seeding surface. In this regard, the abutment of carriage 70 with stops on the sides of the carrier 32 limits the relative movement of packer 68 relative to its associated carrier 32 of cutting head unit 30.

When positioned at the desired location at the seeding surface, frame 12 can be lowered relative to the towing vehicle towards the seeding surface. It can be appreciated that cutting head units 30 will engage the seeding surface, and roller blades 36 will slice into the seeding surface. Simultaneously or thereafter, the power take off of the towing vehicle is actuated to provide power to seeder 10, and in the preferred form providing power to rotate roller blades 36, and in the most preferred form rotating roller blades 36 in the opposite direction to that of the operation movement direction. Further, simultaneously or thereafter, the towing vehicle and thus seeder 10 are moved in the operation movement direction. During movement of the towing vehicle and seeder 10, seed box 96 is actuated to meter seeds therefrom and into hoses 98.

It should be appreciated that in the preferred form, roller blades 36 are utilized having a continuous, smooth periphery generally at a constant extent from axle 34, with each slit in the seeding surface formed by a single roller blade 36. Prior seeders include notched or saw teeth blades which were very effective in creating gaps of a width into which seed could be received. However, blades having rough outer diameters bring up sizeable amount of debris from the turf as they rotate due to the fact that these blades tear and rip the turf and bring it up as unwanted debris, which is particularly true if such rough outer diameter blades are rotated in the opposite direction to the operation movement direction, or in other words in downward fashion as they move forward. Due to their continuous, smooth periphery, blades 36 of the preferred form of the present invention do not have a tendency to tear up and rip the turf and avoids that particular deficiency of prior seeders.

To ensure that the widths of the slit cut in the seeding surface are of a sufficient width to receive seeds, roller blades 36 of the preferred form of the present invention include a series of oppositely formed, equally sized, circumferentially spaced and axially and radially extending indentations 36a extending from the continuous, smooth periphery towards but spaced from the center. In the preferred form, a total of twelve equally sized indentations 36a are provided in each roller blade 36. In the preferred form, the maximum axial extent of indentations 36a beyond a center radially extending plane is in the range of 1.4 to 2.1% and most preferably in the order of 1.6% of the diameter of roller blade 36. In the most preferred form, indentations 36a have a maximum axial extent in the range of 0.1875 to 0.2025 inches and most preferably in the order of 0.2025 inches (0.515 cm) from the center radially extending plane for a total axial extent in the range of 0.375 to 0.405 inches and most preferably in the order of 0.405 inches (1.029 cm) extending equidistance from the center radially extending plane, and roller blades 36 have a diameter in the range of 9.75 to 13 inches and most preferably in the order of 12.5 inches (31.75 cm).

Although being used in agricultural applications and in fact in the preferred form roller blades 36 are purchased off-the-shelf components to reduce capital expenses for manufacture and inventory, it is believed that the use of roller blades 36 having indented, continuously smooth peripheries to create a slit for receiving seeds without enlargement and immediately adjacent roller blades 36 in the seeding direction is a novel and synergistic utilization. In particular, roller blades 36 of the preferred form are not used as coulters for penetrating/ parting the seeding surface for a further instrumentality such as a V-opener to create the slit into which seed is inserted, but rather are used to create a slit into which seed is inserted into the seeding surface. Such use provides synergistic results in overseeding while minimizing detrimental disturbance of existing turf. In this regard with the movement of the periphery of roller blades 36 at a speed different than seeder 10 due to the roller blades 36 being driven as opposed to being rotated due to the engagement with the seeding surface, the smooth periphery and indentations 36a have relative movement to the seeding surface to create a slit therein approximately equal to double the maximum axial extent of indentations 36a. It should be appreciated that the width of the slit formed is enhanced since roller blades 36 are rotated in the opposite direction to the operation movement direction. Slits are formed by roller blades 36 by pushing soil to the side of roller blades 36 and have a generally rectangular cross section having a flat, continuous base and continuous sidewalls extending from the base to the seeding surface. The spacing of the sidewalls is a function of the amount that soil will tend to collapse back into the slit once roller blades 36 pass as well as the result of the rotational speed of roller blades 36 relative to the operative ground speed of seeder 10 along the seeding surface. Specifically, faster relative speeds would initially provide flat sidewalls of a spacing generally approximating the maximum axial extent of roller blade 36 where lower relative speeds would produce sidewalls having a sinusoidal shape of a spacing less than the maximum axial extent of roller blade 36.

It should be appreciated that seeder 10 according to the teachings of the present invention has the advantages of conventional roller blades, which typically are not driven, of not tearing up turf but avoid the disadvantages of the V-shaped slit formed by conventional roller blades. In particular, such V-shaped slits are of too small a width to insure seed insertion therein and minimize the area for seed support at the ideal germination depth of the particular seed. Likewise, seeder 10 according to the teachings of the present invention has the advantages of conventional toothed blades, which typically are driven, of obtaining slits of advantageous width and cross section but avoid the disadvantages of the slits formed by conventional toothed blades. In particular, conventional toothed blades form the slits by pulling and ripping up and out the slits from the seeding surface, and they severely tear up the turf. Further, depending upon rotational speed versus the ground speed, the bases of the slits formed by the conventional toothed blades often are not continuous and/or flat.

In the preferred form, the axial spacing between roller blades 36 is minimized to an extent not physically possible in prior seeders utilizing separately mounted dual disc units to create slits or if roller blades 36 were individually mounted and, in the preferred form, with roller blades 36 located with an axial spacing in the range of 11 to 12.5% and most preferably in the order of 12% of the diameter of roller blades 36 and in the most preferred form are located at an axial spacing in the range of 1.47 to 1.56 inches and most preferably in the order of 1.5 inches (3.81 cm). It should be appreciated that each roller blade 36 cuts a separate slit in the seeding surface which provides an improved germination environment for the seed. Thus, minimizing axial spacing of roller blades 36 minimizes the axial spacing of slits such that seed in any slit can be reduced while maintaining the high plant population per area. The minimal axial spacing is accomplished by providing multiple roller blades 36 on a single axle 34 with spacers 38 axially intermediate roller blades 36. Further, a seed distributor of the type which supplies seeds from a single supply hose 98 to two (or more) adjacent slits formed by roller blades 36 according to the preferred teachings of the present invention allows blades 36 to be axially close as the size of supply hoses 98 is not a limiting factor.

Fingers 46 engage the seeding surface intermediate roller blades 36 and the slits formed thereby according to the preferred teachings of the present invention provide multiple functions. First, fingers 46 act as a depth guide. In particular, the mass of cutting head unit 30 pivotally mounted on jack shaft 24 relative to frame 12 tends to force roller blades 36 into the seeding surface. Further, the bias provided by hold downs 80 between frame 12 and cutting head units 30 tends to force roller blades 36 into the seeding surface utilizing the mass of frame 12 and the towing vehicle holding frame 12 relative to the seeding surface while still allowing cutting head units 30 to float relative to frame 12 and follow the contours of the seeding surface. Furthermore, the bias provided by hold downs 80 is adjustable to correspond to the particular soil conditions of the seeding surface. It should be appreciated that the use of multiple cutting head units 30 in a single seeder 10 of the preferred form produces synergistic results. Specifically, multiple cutting head units 30 are better able to follow contours of the seeding surface (and still allow roller blades 36 to be closely axially spaced) than conventional seeders having a single seeding unit. Thus, seeder 10 according to the preferred teachings of the present invention causes fewer skips and misses than conventional seeders. Further, in the most preferred form, cutting head units 30 of seeder 10 are of identical construction such that parts are interchangeable for ease of manufacture, inventory and maintenance. Furthermore, the use of multiple, individually functional, cutting head units 30 expands the functionality of seeder 10 including, but not limited to, varying the overall planting width by simply varying the number of cutting head units 30 utilized.

Further, fingers 46 according to the preferred teachings of the present invention are located intermediate every adjacent pair of roller blades 36. In the most preferred form, fingers 46 have an axial width generally equal to the operational axial width between blades 36, with fingers 46 having an axial width in the range of 64 to 75% of the axial spacing between roller blades 36 and in the preferred form have an axial width of in the range of 0.97 to 1.15 inches and in the preferred form shown in the order of 0.97 inches (2.46 cm). It can be appreciated that fingers 46 press on the seeding surface to supporting cutting head unit 30 on the seeding surface such that cutting head unit 30 follows the contour of the seeding surface as previously indicated. Furthermore, this down pressure on the turf tends to minimize the creation of unwanted debris from being ripped from the turf and brought up due to the rotation of roller blades 36. Thus, disturbance of the turf for aesthetic, functional and other reasons is minimized utilizing seeder 10 according to the teachings of the present invention.

The depth of slits produced by roller blades 36 can be easily adjusted according to the specific conditions of the desired seeding surface by adjusting the radial spacing of fingers 46 from the rotation axis of roller blades 36. In the preferred form, adjustment can be accomplished by loosening bolt 64, pivoting support 48 relative to carrier 32 and retightening bolt 64 when fingers 46 are at the desired radial spacing from the continuously smooth peripheries of roller blades 36. In this regard, the curvature of fingers 46 allow fingers 46 to operatively engage the seeding surface at any point along its operative length corresponding to the desired radial spacing from roller blades 36 and thus the depth of slits produced thereby. In the most preferred form, adjustment is provided up to a depth of 1-3/8 inch (3.5 cm) which should be sufficient to penetrate most any thatch layer.

An example of a synergistic advantage of seeder 10 of the preferred form of the present invention is the ability to seed over obstacles in the seeding surface such as, but not limited to, yardage markers and sprinkler heads without damage thereto. Such obstacles are often at or slightly below the seeding surface. Since the mass of frame 12 and of the towing vehicle is not directly utilized but generally only the mass of cutting head unit 30 and the bias of hold down 80 associated therewith are utilized in seeder 10 according to the preferred form, cutting head unit 30 engaging such obstacle pivots about the pivot axis defined by jack shaft 24 in the preferred form to ride over the obstacle without damage to the obstacle and/or to seeder 10 and only to the height necessary to clear the obstacle while the other cutting head units 30 continuously slit the seeding surface at the desired depth. This ability either would not be possible or be very seriously limited in the event that a cutting head unit of an operative width of the entire seeder were utilized. Furthermore, due to their continuous, smooth periphery, roller blades 36 of the present invention do not hook the obstacle as would occur if toothed or otherwise discontinuous periphery blades were utilized. Hooking tends to rip the obstacle from the seeding surface.

As previously indicated, seed is directed by the seed distributor to a position slightly above the seeding surface and at spaced linear locations corresponding to roller blades 36 and the slits formed thereby. Seed located inside the slits formed by roller blades 36 are not suspended in the turf and have a much better probability of germination and growth. Conventional seeders often simply utilized a single V-shaped deflector extending laterally across the full width of the seeder and upon which seed from the feeding tubes impacted and fell to the seeding surface in a very haphazard fashion over the entire area of the seeding surface. Seeder 10 according to the preferred teachings of the present invention provides a controlled flow of seed from seed box 96 and carefully placed in an environment which enhances germination and growth.

To ensure that seeds come into firm contact with soil, packers 68 are provided in seeder 10 following the careful placement of seed to press down on the seeds and/or seeding surface to close the slits produced by roller blades 36 and/or compact seeds into the seeding surface. Firm contact of the seeds with the soil helps to retain the seed in position making it more difficult to remove by some outside force. Further, contact of seed with soil enhances the possibility of germination. In the preferred form shown, packer 68 is pivotally mounted relative to carrier 32 to allow packer 68 to independently follow the contour of the seeding surface. Further, packer 68 is not driven but is rotated by being pulled along the seeding surface. Although believed to provide a distinct advantage, seeder 10 could be designed according to the teachings of the present invention not providing seed packing. Further, it should be appreciated that other manners of packing the seeding surface than shown could be utilized according to the teachings of the present invention.

It should be appreciated that due to the ability to overseed while minimizing turf disturbance, seeder 10 according to the preferred teachings of the present invention is able to overseed the seeding surface in different directions in separate seeding operations. As an example, the seeding surface could be overseeded by seeder 10 to form slits extending in a first direction and then overseeded by seeder 10 to form slits extending in a second direction which is not parallel to the first direction such as perpendicular to the first direction. Such double overseeding would be desired such as to increase plant population counts, to plant different seed varieties, or the like. Such double overseeding is not possible with seeders utilizing conventional toothed blades due to the disturbance of the existing turf.

Seeder 10 according to the preferred teachings of the present invention incorporates several inventive aspects which could be utilized singly or in other combinations. However, the preferred form of seeder 10 shown is believed to produce synergistic results. Specifically, seeder 10 can be operated at ground speeds of up to 5 miles (8 km) per hour. Thus, the total time to overseed a turf seeding surface will be less than necessary utilizing conventional seeds. Further, germination rates of about 15% are reported in the field utilizing conventional seeders available on the market, whereas seeder 10 of the preferred form increases germination rates by a large amount. Thus, seeder 10 according to the teachings of the present invention offers a reduction in total labor required to do a specific job and should be able to complete the task with lower seed costs and/or with better seed performance over conventional methods.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Seeder comprising, in combination: a frame for movement along a seeding surface desired to be seeded in a seeding direction; a seed box mounted to the frame; multiple cutting head assemblies independently pivotally mounted to the frame, with each of the multiple cutting head assemblies including a carrier, a blade assembly rotatably mounted to the carrier, with the blade assembly including a plurality of roller blades arranged in a spaced parallel relation and rotatably mounted to the carrier about a rotation axis, with each of the plurality of roller blades forming slits into the seeding surface, with the carrier pivotally mounted to the frame, a seed distributor distributing seeds into the slits formed by the plurality of roller blades in the seeding surface, and spring biased hold downs extending between the frame and the carrier exerting down pressure on the cutting head assembly; and a seed tube extending between the seed box and the seed distributor allowing relative movement of the seed box and the seed distributor.

2. The seeder of claim 1 with the roller blades being driven at a numerical speed different than if free rotating when engaging the seeding surface while moving in the seeding direction.

3. The seeder of claim 1 with each of multiple cutting head assemblies further comprising an axle rotatably mounted to the carrier, with the plurality of roller blades being non-rotatably received on the axle; and a sprocket secured to the axle for driving the axle and the plurality of roller blades non-rotatably received thereon.

4. The seeder of claim 3 further comprising, in combination: a jack shaft rotatably mounted to the frame and driven for rotation, with the carrier of each of the cutting head assemblies being pivotally mounted to the jack shaft for independently pivotally mounting the cutting head assembly to the frame, with the jack shaft being in gearing relation to the sprocket of each of the cutting head assemblies.

5. Seeder comprising, in combination: a frame for movement along a seeding surface desired to be seeded in a seeding direction; multiple cutting head assemblies independently pivotally mounted to the frame, with each of the multiple cutting head assemblies including a carrier, a blade assembly rotatably mounted to the carrier, with the blade assembly including a plurality of roller blades arranged in a spaced parallel relation and rotatably mounted to the carrier about a rotation axis, with each of the plurality of roller blades forming slits into the seeding surface, with the carrier pivotally mounted to the frame, a seed distributor distributing seeds into the slits formed by the plurality of roller blades in the seeding surface, and spring biased hold downs extending between the frame and the carrier exerting down pressure on the cutting head assembly, with the roller blades being driven at a numerical speed different than if free rotating when engaging the seeding surface while moving in the seeding direction.

6. The seeder of claim 5 further comprising, in combination: a jack shaft rotatably mounted to the frame and driven for rotation, with the carrier of each of the cutting head assemblies being pivotally mounted to the jack shaft for independently pivotally mounting the cutting head assembly to the frame, with the jack shaft being in rotational relation with the blade assembly of each of the multiple cutting head assemblies.

7. The seeder of claim 6 with each of multiple cutting head assemblies further comprising an axle rotatably mounted to the carrier, with the plurality of roller blades being non-rotatably received on the axle; and a sprocket secured to the axle for driving the axle and the plurality of roller blades non-rotatably received thereon, with the jack shaft being in gearing relation to the sprocket of each of the cutting head assemblies.

8. Cutting head assembly comprising, in combination: a carrier for movement relative to a seeding surface in a seeding direction; a blade assembly rotatably mounted to the carrier, with the blade assembly including a plurality of roller blades arranged in a spaced parallel relation and rotatably mounted to the carrier about a rotation axis, with the roller blades forming slits into the seeding surface; and a plurality of fingers arranged in a spaced parallel relation, with each of the plurality of fingers located intermediate adjacent roller blades of the plurality of roller blades, with the plurality of fingers engaging the seeding surface intermediate the plurality of roller blades and the slits formed thereby, with the plurality of fingers being adjustably mounted to the carrier to adjust spacing of the plurality of fingers from the rotation axis of the plurality of roller blades to provide depth adjustment of the slits formed by the plurality of roller blades.

9. The cutting head assembly of claim 8 further comprising, in combination: a support pivotally mounted to the carrier about a support axis parallel to and spaced from the rotation axis, with the plurality of fingers mounted to the support for movement therewith.

10. The cutting head assembly of claim 9 further comprising, in combination: a first mast extending from the support; a second mast extending from the carrier and a movable relative to the first mast with pivotable movement of the carrier, with the first and second masts being removably secured to the each other spaced from the support axis; a lost motion slot formed in one of the first and second masts; and a bolt carried by the other of the first and second masts and extending through the lost motion slot for removably securing the first and second masts together.

11. Cutting head assembly comprising, in combination: a carrier for movement relative to a seeding surface in a seeding direction; at least one roller blade rotatably mounted to the carrier about a rotation axis and forming a slit into the seeding surface, with the roller blade including a continuous, smooth periphery at a constant extent from the rotation axis, with the roller blade including a series of oppositely formed, circumferentially spaced and radially extending indentations extending from the continuous, smooth periphery; and a seed distributor for placing seed into the slit created by the roller blade without enlargement immediately adjacent the roller blade in the seeding direction.

12. The cutting head assembly of claim 11 with the roller blade being driven at a numerical speed different than if free rotating when engaging the seeding surface while moving in the seeding direction.

13. The cutting head assembly of claim 12 further comprising, in combination: an axle rotatably mounted to the carrier, with the at least one roller blade comprising a plurality of roller blades, with the plurality of roller blades being non-rotatably received on the axle; and a sprocket secured to the axle for driving the axle and the plurality of roller blades non-rotatably received thereon.

14. Method of seeding comprising: slitting a seeding surface in a seeding direction by rotating at least one roller blade including a continuous, smooth periphery at a constant extent from a rotation axis with the roller blade including a series of oppositely formed, circumferentially spaced and radially extending indentations extending from the continuous, smooth periphery; and inserting seed into the slit created by the roller blade without enlargement and immediately adjacent the roller blade in the seeding direction.

15. The method of claim 14 with rotating the at least one roller blade comprising rotating the at least one roller blade at a numerical speed different than if free rotating when engaging the seeding surface while moving in the seeding direction.

16. The method of claim 15 with rotating the at least one blade comprising rotating the at least one roller blade in a direction opposite than if free rotating when engaging the seeding surface while moving in the seeding direction.

17. The method of claim 16 with rotating the at least one roller blade comprising rotating an axle including multiple roller blades non-rotatably received thereon.

18. Seeder comprising, in combination: a cutting head assembly including multiple instrumentalities each forming a slit into a seeding surface when moved in a seeding direction; a seed box holding seeds to be seeded and having multiple outlets, with the multiple outlets being substantially less in number than the multiple instrumentalities, with the multiple instrumentalities including a first instrumentality adjacent a second instrumentality, the second instrumentality adjacent a third instrumentality, and the third instrumentality adjacent a fourth instrumentality, with the second and third instrumentalities located intermediate the first and fourth instrumentalities, with the multiple outlets including a first outlet adjacent a second outlet, with the seed from the first outlet being directed to the first and second instrumentalities and from the second outlet being directed to the third and fourth instrumentalities.

19. The seeder of claim 18 further comprising, in combination:
   at least first and second diverters, with the multiple outlets each including a tube, with the tube of the first outlet communicating with the first diverter, with the first diverter directing the seed from the first outlet to the first and second instrumentalities, with the tube of the second outlet communicating with the second diverter, with the second diverter directing the seed from the second outlet to the third and fourth instrumentalities.

20. The seeder of claim 19 further comprising, in combination: a seed distributor carried by the cutting head assembly, with the first and second diverters located in and carried as a unit in the seed distributor, with the seed distributor being in the form of a box having a closed leading side and a closed trailing side, with the leading side located ahead of the trailing side in the seeding direction, with the first and second diverters extending between the leading and trailing sides, with the first and second diverters having wedged-shaped cross-sections perpendicular to the seeding direction, with the wedged-shaped cross-sections including an upper edge and first and second lower edges spaced from each other perpendicular to the seeding direction, with the tube of the first outlet terminating adjacent the upper edge of the first diverter and the tube of the second outlet terminating adjacent to the upper edge of the second diverter.

* * * * *